(12) United States Patent
Kriltz et al.

(10) Patent No.: US 7,166,359 B2
(45) Date of Patent: Jan. 23, 2007

(54) BLUE COLORED COATED ARTICLE WITH LOW-E COATING

(75) Inventors: Uwe Kriltz, Jena (DE); Jochen Butz, Wolfen (DE)

(73) Assignee: Centre Luxembourgeois de Recherches pour le Verre et la Ceramique S.A. (C.R.V.C.), Grand Duche de Luxembourg ( * ) Notice: Subject to any disclaimer, the term of this patent is extended or adjusted under 35 U.S.C. 154(b) by 0 days.

(21) Appl. No.: 11/166,347

(22) Filed: Jun. 27, 2005

(65) Prior Publication Data

US 2006/0292381 A1    Dec. 28, 2006

(51) Int. Cl.
*B32B 17/06* (2006.01)

(52) U.S. Cl. .................. 428/428; 428/432; 428/446; 428/448; 428/698; 428/697; 428/699; 428/701; 428/702; 428/704

(58) Field of Classification Search ............. 428/428, 428/432, 446, 448, 698, 697, 699, 701, 702, 428/704
See application file for complete search history.

(56) References Cited

U.S. PATENT DOCUMENTS

| | | | |
|---|---|---|---|
| 5,344,718 | A | 9/1994 | Hartig et al. |
| 5,514,476 | A | 5/1996 | Hartig et al. |
| 5,584,902 | A | 12/1996 | Hartig et al. |
| 6,605,358 | B1 | 8/2003 | Stachowiak |
| 6,623,846 | B2 | 9/2003 | Laird |
| 6,686,050 | B2 | 2/2004 | Lingle et al. |
| 6,692,831 | B2 | 2/2004 | Stachowiak |
| 6,716,532 | B2 | 4/2004 | Neuman et al. |
| 6,749,941 | B2 | 6/2004 | Lingle |
| 6,782,718 | B2 | 8/2004 | Lingle et al. |
| 6,802,943 | B2 | 10/2004 | Stachowiak |
| 6,863,928 | B2 | 3/2005 | Stachowiak |
| 2005/0079369 | A1* | 4/2005 | Stachowiak ............. 428/469 |

* cited by examiner

*Primary Examiner*—Jennifer C. McNeil
*Assistant Examiner*—G. Blackwell
(74) *Attorney, Agent, or Firm*—Nixon & Vanderhye P.C.

(57) ABSTRACT

A coated article is provided with at least one infrared (IR) reflecting layer, and is designed so as to realize good blue glass side reflective coloration in combination with desired solar control characteristics. In certain example embodiments, the coated is designed to realize rather negative glass side reflective b* values, in combination with fairly neutral glass side reflective a* color values and good sheet resistance and/or emissivity. The coated article may be used in the context of architectural or other types of window units in certain example embodiments of this invention.

21 Claims, 1 Drawing Sheet

BLUE COLORED COATED ARTICLE WITH LOW-E COATING

Certain embodiments of this invention relate to an insulating glass (IG) window unit or other type of window unit including a coating designed so as to permit the coated article to realize a blue glass side reflective color. In particular, thicknesses of layers in the coating are designed so as to permit this blue color to be realized. The coated article may or may not be heat treated in different example embodiments of this invention.

BACKGROUND AND SUMMARY OF THE INVENTION

Coated articles and IG window units are known which use the following coating: glass/SiN/NiCr/Ag/NiCr/SiN. For example, see U.S. Pat. Nos. 6,605,358, 6,730,352 and 6,802,943, the disclosures of which are hereby incorporated herein by reference. While these coated articles provide for good results in many applications, their color characteristics are sometimes not desired.

In particular, a fairly strong blue color (e.g., glass side reflective color) is sometimes desired. Typical glass/SiN/NiCr/Ag/NiCr/SiN coated articles do not provide such strong blue glass side coloration along with desired solar characteristics. For example, prior to heat treatment, Example 1 of U.S. Pat. No. 6,605,358 having a stack of glass/SiN/NiCrN/Ag/NiCrN/SiN realized a glass side reflective a* color of −0.96 and a glass side reflective b* color of −7.92. These color values slightly change upon heat treatment (HT). Unfortunately, the b* value of −7.92 is not blue enough for certain applications.

In view of the above, it will be appreciated that there is a need in the art for a coated article that is capable of realizing a combination of good solar control characteristics and desired blue color (e.g., glass side reflective color).

In certain example embodiments of this invention, it has surprisingly been found that a desirable blue color can be realized, in combination with good solar characteristics, by adjusting thicknesses of layer(s) in the coating.

In certain example embodiments of this invention, a coating is provided that realizes glass side reflective b* coloration of from about −15 to −25, more preferably from about −16 to −23 (before and/or after optional heat treatment), in combination with glass side reflective a* coloration of from about −4 to +4, more preferably from about −2 to +2. Good solar control characteristics (e.g., fairly low sheet resistance and/or emissivity) can also be achieved. The combination of these desirable features may be realized by thickening the lower dielectric layer in certain example embodiments of this invention, while possibly providing a thicker upper dielectric layer in certain example instances.

Coated articles according to certain example embodiments of this invention may be used in the context of insulating glass (IG) window units, monolithic windows, or in other suitable applications in different instances.

In certain example non-limiting embodiments of this invention, a coated article is provided having a stack of glass/SiN/NiCr/Ag/NiCr/SiN, where the bottom silicon nitride inclusive layer has a thickness of from about 72.5 to 110 nm, more preferably from about 80–95 nm. The top silicon nitride inclusive layer may have a thickness of from about 30–70 nm, more preferably from about 48–65 nm. These thickness ranges used in combination allow for desirable significantly blue coloration to be realized in certain example embodiments of this invention.

In certain example embodiments of this invention, there is provided a coated article including a multi-layer coating supported by a glass substrate, the coating comprising at least the following layers from the glass substrate outwardly: a first layer comprising silicon nitride; a first contact layer comprising Ni and/or Cr; an infrared (IR) reflecting layer comprising silver located over and directly contacting the first contact layer comprising Ni and/or Cr; a second contact layer comprising Ni and/or Cr located over and directly contacting the IR reflecting layer; a second layer comprising silicon nitride on the glass substrate located over at least the IR reflecting layer, the contact layers and the first layer comprising silicon nitride; and wherein the first layer comprising silicon nitride is from about 72.5 to 110 nm thick, and wherein the coated article has the following glass side reflective color values: a* from −4 to +4, and b* from −15 to −25.

In other example embodiments of this invention, there is provided a coated article including a multi-layer coating supported by a glass substrate, the coating comprising at least the following layers from the glass substrate outwardly: a first layer comprising silicon nitride; a first contact layer; an infrared (IR) reflecting layer located over and directly contacting the first contact layer; a second contact layer located over and directly contacting the IR reflecting layer; a dielectric layer; wherein the first layer comprising silicon nitride is from about 72.5 to 110 nm thick, and wherein the coated article has the following glass side reflective color values: a* from −4 to +4, and b* from −15 to −25.

DETAILED DESCRIPTION OF CERTAIN EXAMPLE EMBODIMENTS OF THE INVENTION

Certain embodiments of this invention relate to a coated article including a coating supported by a substrate. The coating may be provided either directly on and in contact with the underlying substrate, or alternatively may be provided on the substrate with other layer(s) therebetween. In certain example instances, coated articles according to certain embodiments of this invention may be used in a window unit (e.g., IG window unit, or any other suitable type of window unit), and realizes desirable visible transmission ($T_{vis}$), visible glass side reflectance ($R_gY$), transmissive color (a* and/or b*), and/or glass side reflective color (a* and/or b*). In certain example embodiments of this invention, glass side reflective blue color with respect to a* and b* is particularly important.

Figure 1:
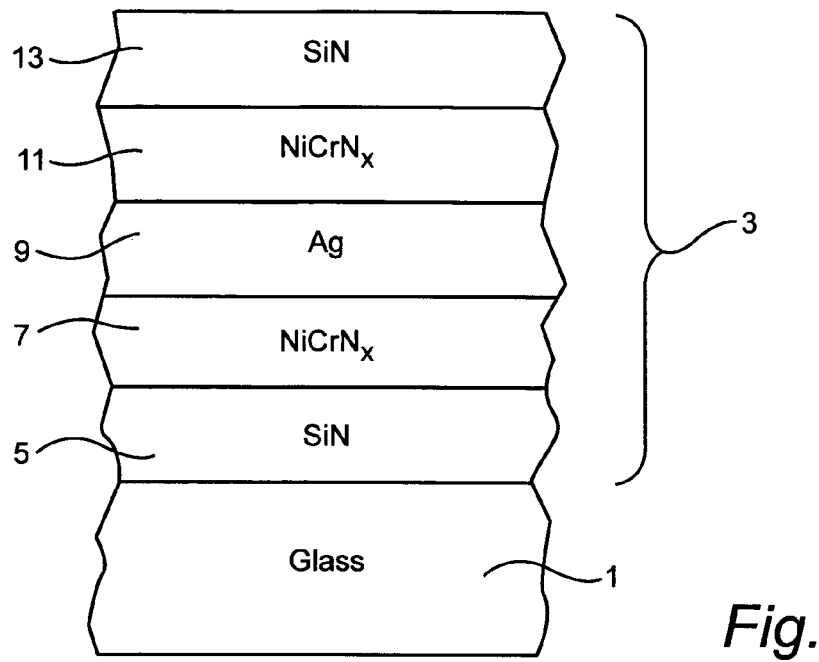
FIG. 1 is a cross sectional view of a coating on a substrate according to an example embodiment of this invention.

FIG. 1 illustrates a coating 3 according to an example embodiment of this invention, supported by glass substrate 1. Substrate 1 is preferably glass such as soda-lime-silica glass, borosilicate glass, or the like. As for glass color, substrate 1 may be clear, green, bronze, blue-green, grey, or any other suitable color in different embodiments of this invention, and is preferably from about 1.0 to 10.0 mm thick, more preferably from about 1.0 mm to 6.5 mm thick (e.g., 4 to 6 mm thick).

The coating 3 shown in FIG. 1 includes, from the glass substrate 1 outwardly, silicon nitride inclusive layer 5, bottom contact layer 7, infrared (IR) reflecting layer 9, top contact layer 11, and top dielectric layer 13. The "contact" layers 7 and 11 each contact IR reflecting layer 9. Infrared (IR) reflecting layer 9 is preferably metallic or mostly metallic, and conductive, and may be made of or include silver (Ag), gold, alloys thereof, or any other suitable IR reflecting material. However, metallic or substantially metallic Ag is the material of choice for the IR reflecting layer 9 in certain example non-limiting embodiments of this invention. The IR reflecting layer allows coating 3 to have good solar control characteristics such as fairly low sheet resistance and/or emissivity.

One or both of contact layers 7 and 11 may be of or include Ni and/or Cr in certain example embodiments of this invention. In certain example embodiments, one or both of contact layers 7, 11 is of or includes nickel (Ni), chromium (Cr), or an alloy of nickel-chrome (NiCr) in different embodiments of this invention. The Ni, Cr, or NiCr may be nitrided (e.g., $NiCrN_x$) in certain example embodiments of this invention, which is good for improving optical stability of the coated upon heat treatment such as thermal tempering. In certain example embodiments, it will thus be appreciated that one or both of contact layers 7 and 11 may comprise nickel oxide, chromium/chrome oxide, a nickel alloy oxide such as nickel chrome oxide ($NiCrO_x$), a nickel alloy nitride such as nickel chrome nitride ($NiCrN_x$), or a nickel alloy oxynitride such as nickel chrome oxynitride ($NiCrO_xN_y$) in certain example embodiments of this invention. When one or both of contact layers 7 and 11 comprise NiCr or $NiCrN_x$ in certain embodiments, the Ni and Cr may be provided in different amounts, such as in the form of nichrome by weight about 80–90% Ni and 10–20% Cr. In other embodiments, sputtering targets used in sputtering layer(s) 7 and/or 11 may be 50/50 Ni/Cr, 60/40 Ni/Cr, 70/30 Ni/Cr, or any other suitable weight ratio. An exemplary sputtering target for depositing these layers includes not only SS-316 which consists essentially of 10% Ni and 90% other ingredients, mainly Fe and Cr, but potentially Haynes 214 alloy as well (e.g., see U.S. Pat. No. 5,688,585). Optionally, one or both of contact layer(s) 7 and/or 11 may be oxidation and/or nitrogen graded in different embodiments of this invention so as to be more metallic closer to the IR reflecting layer and less metallic further from the IR reflecting layer 9. The contact layers 7 and 11 may or may not be continuous in different embodiments of this invention, depending upon their respective thicknesses.

One or both of dielectric layers 5 and 13 may be of or include silicon nitride (e.g., stoichiometric $Si_3N_4$ or any other suitable non-stoichiometric form of silicon nitride) in certain example embodiments of this invention. The silicon nitride may be doped with Al, stainless steel, or the like in certain example embodiments of this invention. In certain example embodiments, one or both of dielectric layers 5, 13 may be of or include silicon oxynitride, silicon oxide, or any other suitable dielectric material. Optionally, other layers may be provide on substrate 1 over dielectric layer 13 in certain embodiments of this invention, or under layer 5, or otherwise located in certain example instances. In certain example embodiments, dielectric layer 5 may comprise a silicon-rich (Si-rich) form of silicon nitride (i.e., $Si_xN_y$ where x/y may be from about 0.76 to 2.0, more preferably from about 0.80 to 1.5, and most preferably from about 0.80 to 1.3). Making the silicon nitride layer 5 non-stoichiometric by increasing its Si content causes the layer's index of refraction "n" and extinction coefficient "k" to increase (e.g., in the range of 350–550 nm). In particular, in certain example embodiments of this invention, increasing the Si content in silicon nitride layer 5 (i.e., making it Si-rich) causes the layer to have an index of refraction "n" (at 550 nm) of from 2.15 to 2.6, more preferably from 2.2 to 2.5, and most preferably from 2.35 to 2.45 (compare to an index of refraction "n" of 2.05 for stoichiometric $Si_3N_4$). As stated above, making layer 5 Si-rich causes both "n" and "k" to rise; however care may be taken to make sure that "k" does not rise too much. In particular, if "k" becomes too high (e.g., greater than 0.07), an undesirable brown color may be realized in certain instances. Thus, it is sometimes desirable not to make the silicon nitride layer 5 too Si-rich. In certain embodiments of this invention, the Si content in the silicon nitride layer 5 is raised (to make it non-stoichiometric) to an extent such that the layer's extinction coefficient "k" (at 550 nm) is from 0 to 0.07, more preferably from 0 to 0.06, even more preferably from 0 to 0.05, and most preferably from 0.0001 to 0.05.

In certain example embodiments of this invention, coating 3 may include at least the below listed layers, from the glass substrate outwardly (example thicknesses listed in units of nm):

TABLE 1

Example Coating

| Layer Glass Substrate (1–10 mm) | Preferred Range (nm) | More Preferred (nm) | Most Preferred (nm) |
|---|---|---|---|
| SiN (5) | 72.5–110 nm | 75–105 nm | 80–95 nm |
| NiCr or NiCrN (7) | 3–12 nm | 4–8 nm | 5–7 nm |
| Ag (9) | 4–12 nm | 5–11 nm | 7–11 nm |
| NiCr or NiCrN (11) | 3–12 nm | 4–8 nm | 5–7 nm |
| SiN (13) | 30–70 nm | 40–70 nm | 48–65 nm |

The increased thickness of the bottom silicon nitride inclusive layer 5 has been found to be particularly useful in achieve desired blue glass side reflective coloration of the coated article, when the other layers are of thicknesses used to obtain desired solar control characteristics. In certain example embodiments of this invention, the ratio of the thickness of layer (5)/layer (13) is from about 1.4 to 2.0, more preferably from about 1.5 to 1.9, and most preferably from about 1.6 to 1.8. In combination, the utilized thicknesses above permit the desired blue coloration and good solar control and optical characteristics to be simultaneously realized by the coated article before and/or after heat treatment.

In an example non-limiting embodiment, base silicon nitride layer 5 is about 85 nm thick, bottom NiCr inclusive contact layer 7 is about 6 nm thick, Ag based IR reflecting layer 9 is about 9 nm thick, upper NiCr inclusive contact layer 11 is about 6 nm thick, and overcoat silicon nitride layer 13 about 50 nm thick.

Figure 2:
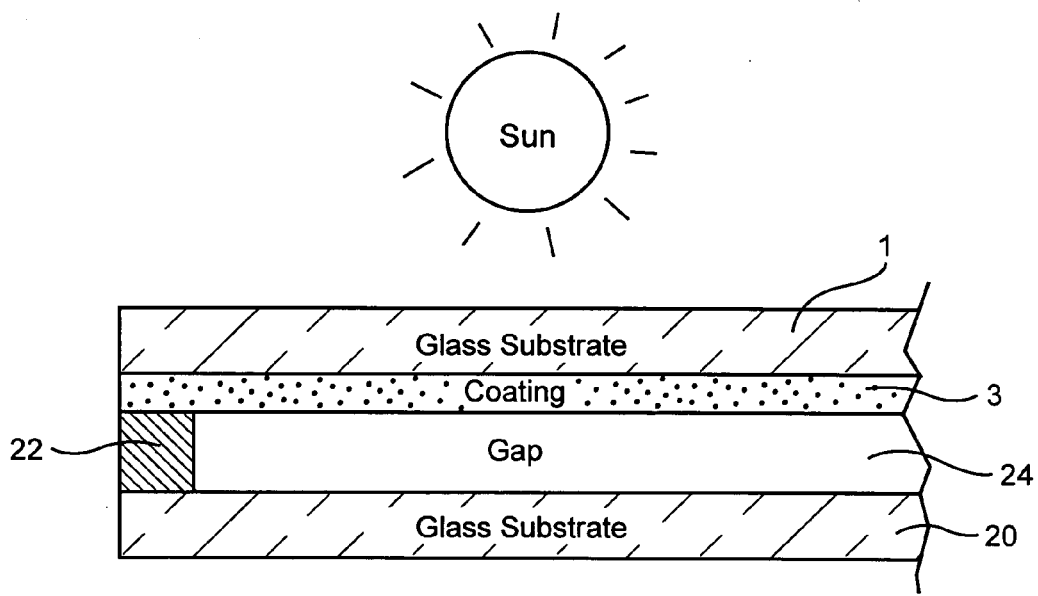
FIG. 2 is a cross sectional view of an insulating glass (IG) window unit including the coating of FIG. 1 according to an example embodiment of this invention.

FIG. 2 illustrates part of an IG window unit including the coating 3 of FIG. 1. As shown in FIG. 2, the coated substrate 1 is preferably coupled (after HT in certain instances) to another substrate (glass or plastic) 20 via at least one spacer and/or seal 22 so as to form an IG window unit. The space or gap 24 between the opposing substrates may or may not be evacuated to a pressure below atmospheric in different embodiments of this invention. Moreover, the space or gap 24 between the substrates may or may not be filled with a gas (e.g., Ar) in different embodiments of this invention.

Heat treatment (e.g., thermal tempering) is optional. In certain example embodiments, the coated article may be heat treated which often necessitates heating the coated substrate to temperatures of from 500° C. to 800° C. (more preferably from about 580 to 750 degrees C.) for a sufficient period of time, e.g., 1 to 15 minutes, to attain the desired result, e.g., thermal tempering, bending, and/or heat strengthening).

In certain example embodiments of this invention, coated articles herein have the following optical characteristics in monolithic form (i.e., not in IG Unit form), prior to any optional heat treatment, and measured with regard to Ill. C, 2 degree observer. Note that the a* and b* characteristics below are for before and/or after heat treatment of the monolithic coated article.

TABLE 2

Example Characteristics (Monolithic) (Before/After HT)

| Characteristic | General | More Preferred | Most Preferred |
|---|---|---|---|
| $T_{vis}$ (or TY) (transmissive): | 30–60% | 35–55% | 37–50% |
| $a^*_t$: | −7.0 to +1.0 | −6.0 to 0 | −4.5 to −0.5 |
| $b^*_t$: | −2.0 to 5.0 | 0.5 to 3.5 | 0.5 to 3.5 |
| $R_gY$ (glass side): | 15 to 30% | 15 to 25% | 17 to 23% |
| $a^*_g$: | −4.0 to +4.0 | −3.0 to +3.0 | −2 to +2 |
| $b^*_g$: | −15 to −25 | −16 to −23 | −17 to −22 |
| $R_fY$ (film side): | 6 to 18% | 8 to 16% | 10 to 14% |
| $a^*_f$: | −10 to +20 | −5 to +18 | +5 to +15 |
| $b^*_f$: | −10 to +20 | −5 to +18 | +5 to +16 |
| Sheet Resistance pre-HT: | <= 11 ohms/sq. | <= 10 ohms/sq. | <= 9 Ω/sq. |
| Sheet Resistance post-HT: | <= 9 ohms/sq. | <= 8 ohms/sq. | <= 7 Ω/sq. |

It can be seen from the very negative glass side reflective b* coloration, in combination with the fairly neutral glass side reflective a* coloration, that good blue glass side reflective color is realized. This was surprisingly achieved as discussed above by adjusting the thicknesses of the layer(s) of the coated article according to certain example embodiments of this invention.

In certain example embodiments of this invention, the monolithic coated article may be used in an IG window unit as shown in FIG. 2 of the instant application for example. In such IG embodiments, the IG window unit may a visible transmission of from about 25 to 55%, more preferably from about 30 to 50%, and most preferably from about 35 to 45%. The same good blue glass side reflective coloration is realized in an IG unit.

EXAMPLES

The following Example coated article was made in accordance with certain embodiments of this invention. For the Example, a coating as shown in FIG. 1 was sputter-deposited onto a 6 mm thick clear glass substrate, and had the following layer stack from the glass substrate outwardly (the silicon nitride layers were doped with about 2% Al):

| Layer Glass Substrate (6 mm) | Thickness (nm) |
|---|---|
| SiN (5) | 85 nm |
| NiCrN (7) | 12 nm |
| Ag (9) | 5 nm |
| NiCrN (11) | 9 nm |
| SiN (13) | 50 nm |

As coated, without any tempering and measured monolithically, the coated article of this Example had the following characteristics:

Example 1 (monolithic; pre-HT)

| Characteristic | Example 1 |
|---|---|
| $T_{vis}$ (or TY) (transmissive): | 39.7% |
| $a^*_t$: | −3.6 |
| $b^*_t$: | 1.9 |
| $R_gY$ (glass side): | 21.4% |
| $a^*_g$: | 0 |
| $b^*_g$: | −17.2 |
| $R_fY$ (film side): | 12.7% |
| $a^*_f$: | 13.3 |
| $b^*_f$: | 14.6 |
| Sheet Resistance ($R_s$): | 7.7 ohms/sq. |
| Emissivity (normal): | 8.7% |

The coated article of the Example was then heat treated (HT) for thermal tempering in a belt furnace at about 620 degrees C. for about 9:30 minutes. Following this heat treatment, the coated article had the following characteristics:

Example 1 (monolithic; post-HT)

| Characteristic | Example 1 |
|---|---|
| $T_{vis}$ (or TY) (transmissive): | 40.3% |
| $a^*_t$: | −3.5 |
| $b^*_t$: | 2.2 |
| $R_gY$ (glass side): | 18.5% |
| $a^*_g$: | 0.8 |
| $b^*_g$: | −19.2 |
|  | 9 |
| $R_fY$ (film side): | 11.0% |
| $a^*_f$: | 13.4 |
| $b^*_f$: | 14.7 |
| Sheet Resistance ($R_s$): | 6.2 ohms/sq. |
| Emissivity (normal): | 7.1% |

The coated article of the example was then put in an IG unit as shown in FIG. 2, so that the low-E coating was on surface #2 of the IG window unit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example and without limitation, other layer(s) may be added to the coating (e.g., between layer 5 and the glass substrate, or between any of the other layers of the coating, or even over the top dielectric layer shown in the figures).

The invention claimed is:

1. A coated article including a multi-layer coating supported by a glass substrate, the coating comprising at least the following layers from the glass substrate outwardly:

a first layer comprising silicon nitride;

a first contact layer comprising Ni and/or Cr;

an infrared (IR) reflecting layer comprising silver located over and directly contacting the first contact layer comprising Ni and/or Cr;

a second contact layer comprising Ni and/or Cr located over and directly contacting the IR reflecting layer;

a second layer comprising silicon nitride on the glass substrate located over at least the IR reflecting layer, the contact layers and the first layer comprising silicon nitride; and wherein the first layer comprising silicon nitride is from about 72.5 to 110 nm thick, and wherein the coated article has the following glass side reflective color values: a* from −4 to +4, and b* from −15 to −25.

2. The coated article of claim 1, wherein the first layer comprising silicon nitride is from about 75 to 105 nm thick, and wherein the coated article has the following glass side reflective color values: a* from −3 to +3, and b* from −16 to −23.

3. The coated article of claim 1, wherein the first layer comprising silicon nitride is from about 80 to 95 nm thick, and wherein the coated article has the following glass side reflective color values: a* from −2 to +2, and b* from −17 to −22.

4. The coated article of claim 1, wherein the second layer comprising silicon nitride is from about 30–70 nm thick, the coated article has a sheet resistance of no greater than about 10 ohms/square, and a visible transmission of from about 30–60%.

5. The coated article of claim 1, wherein the coated article has a sheet resistance of no greater than about 10 ohms/square, and a visible transmission of from about 30–60%.

6. The coated article of claim 1, wherein the coated article is an insulating glass (IG) window unit.

7. The coated article of claim 1, wherein at least one of the first and second contact layers comprises NiCr.

8. The coated article of claim 1, wherein each of the first and second contact layers comprise NiCr.

9. The coated article of claim 1, wherein one or both of the first and second contact layers comprises a nitride of NiCr and wherein the coated article is thermally tempered.

10. The coated article of claim 1, wherein the coating includes only a single Ag based layer which is the IR reflecting layer.

11. The coated article of claim 1, wherein the first layer comprising silicon nitride is in direct contact with the glass substrate.

12. The coated article of claim 1, wherein another dielectric layer is between the glass substrate and the first layer comprising silicon nitride.

13. The coated article of claim 1, wherein each of the first and second layers comprising silicon nitride further comprise aluminum.

14. The coated article of claim 1, wherein the coating consists essentially of the layers recited.

15. A coated article including a multi-layer coating supported by a glass substrate, the coating comprising at least the following layers from the glass substrate outwardly:
a first layer comprising silicon nitride;
a first contact layer;
an infrared (IR) reflecting layer comprising silver located over and directly contacting the first contact layer;
a second contact layer located over and directly contacting the IR reflecting layer;
a dielectric layer;
wherein the first layer comprising silicon nitride is from about 72.5 to 110 nm thick, and wherein the coated article has the following glass side reflective color values: a* from −4 to +4, and b* from −15 to −25.

16. The coated article of claim 15, wherein the first layer comprising silicon nitride is from about 75 to 105 nm thick, the dielectric layer comprises silicon nitride, and the coated article has the following glass side reflective color values: a* from −3 to +3, and b* from −16 to −23.

17. The coated article of claim 15, wherein the first layer comprising silicon nitride is from about 80 to 95 nm thick, and wherein the coated article has the following glass side reflective color values: a* from −2 to +2, and b* from −17 to −22.

18. The coated article of claim 15, wherein the coated article has a sheet resistance of no greater than about 10 ohms/square, a visible transmission of from about 30–60%, and wherein one or both of the contact layers comprises Ni and/or Cr.

19. The coated article of claim 15, wherein the coated article has a sheet resistance of no greater than about 10 ohms/square, and a visible transmission of from about 30–60%.

20. The coated article of claim 15, wherein the coated article is an insulating glass (IG) window unit.

21. A coated article including a multi-layer coating supported by a glass substrate, the coating comprising at least the following layers from the glass substrate outwardly:
a first layer comprising silicon nitride;
a first contact layer;
an infrared (IR) reflecting layer comprising silver located over and directly contacting the first contact layer;
a second contact layer located over and directly contacting the IR reflecting layer;
a dielectric layer; and
wherein the coated article has a glass side reflective color value b* of from −15 to −25.

* * * * *